FIG. I

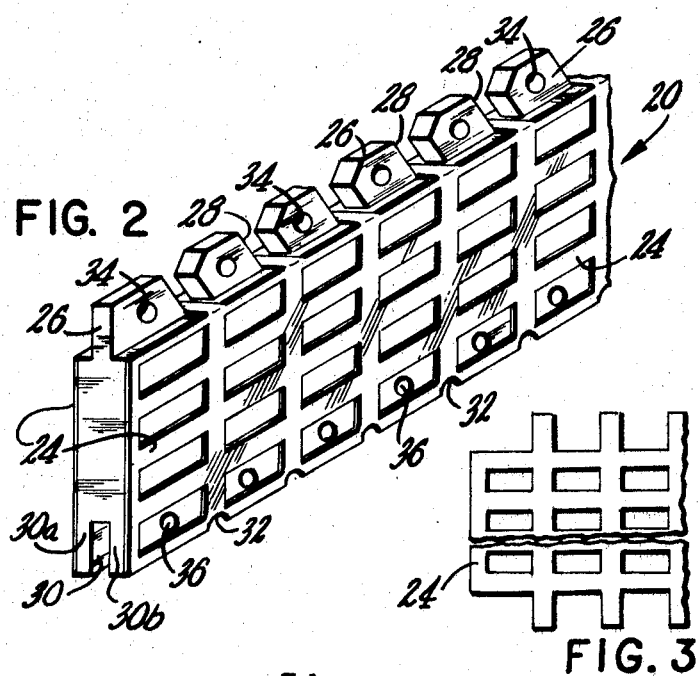
FIG. 2
FIG. 3
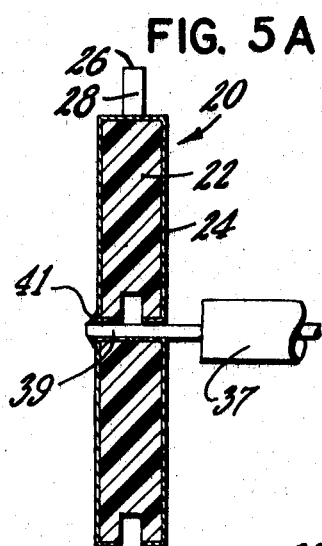
FIG. 5A
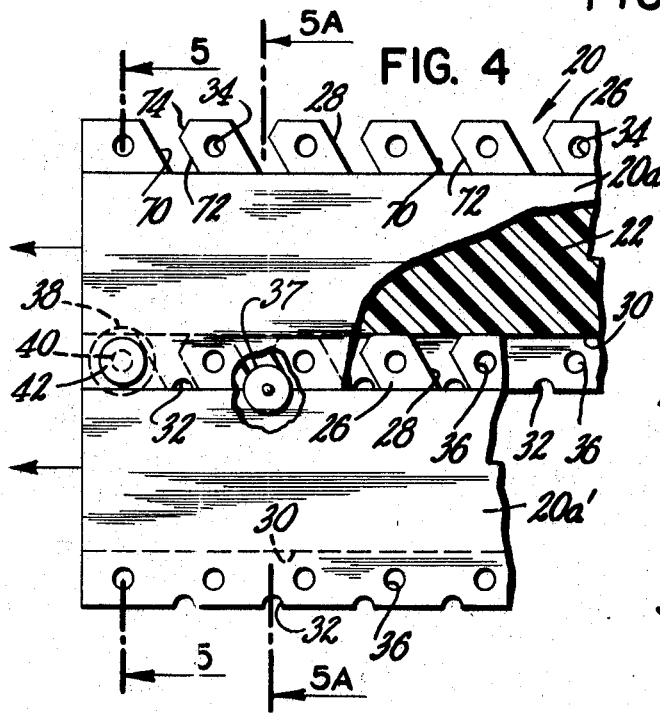
FIG. 4
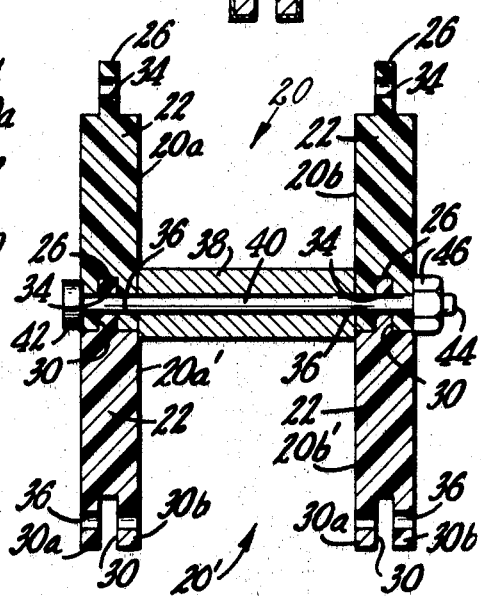
FIG. 5
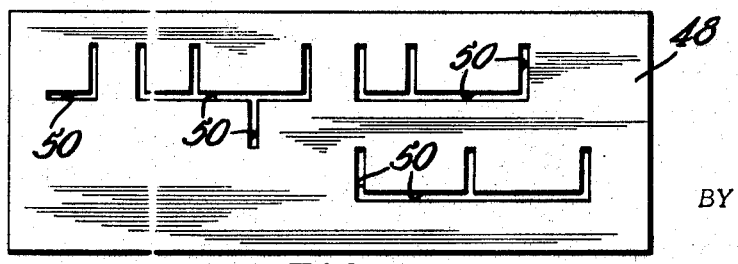
FIG. 6
INVENTOR.
GEORGE E. CHILTON
BY
Leonard H. King
ATTORNEY

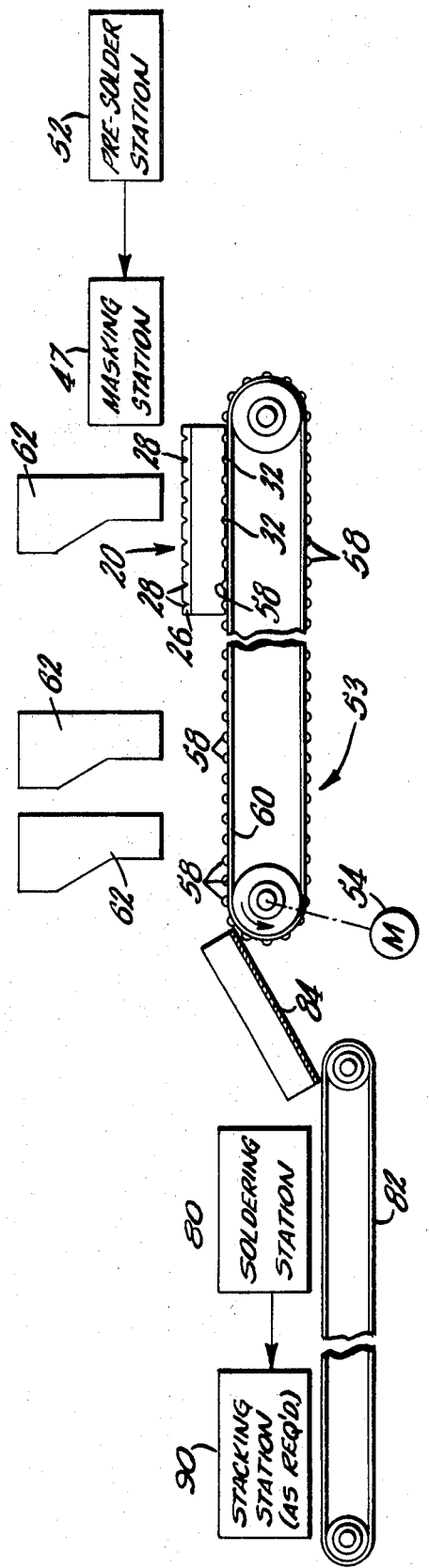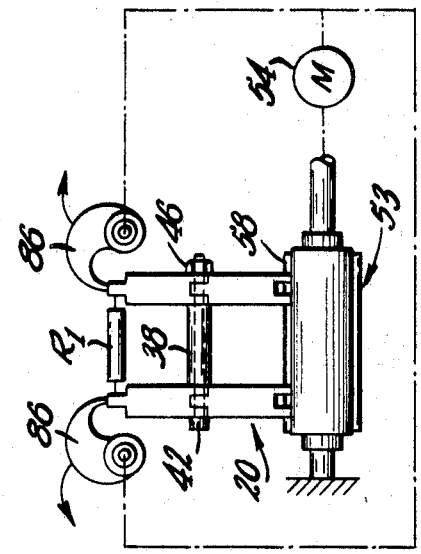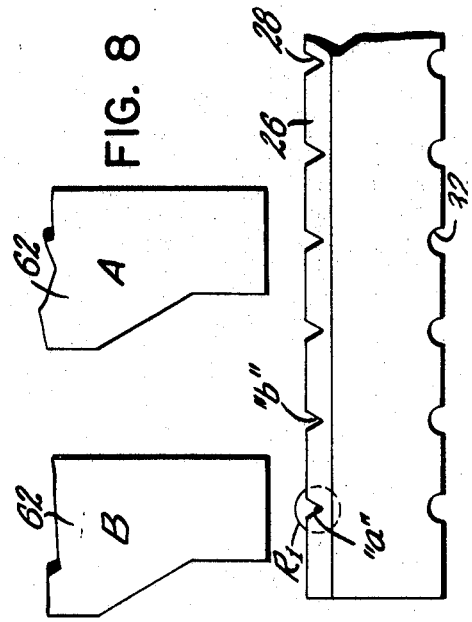

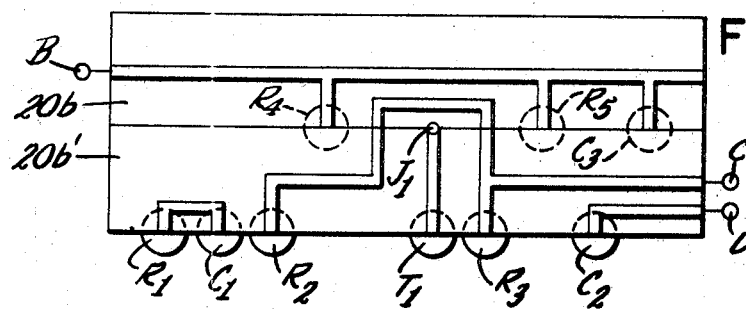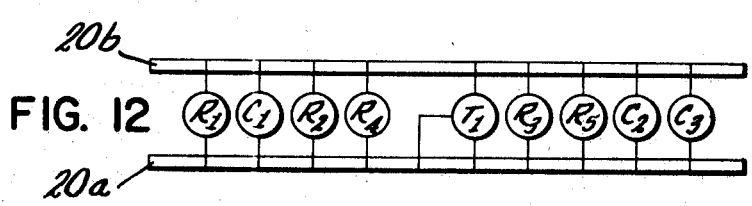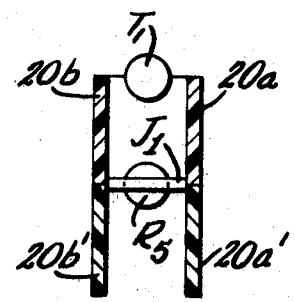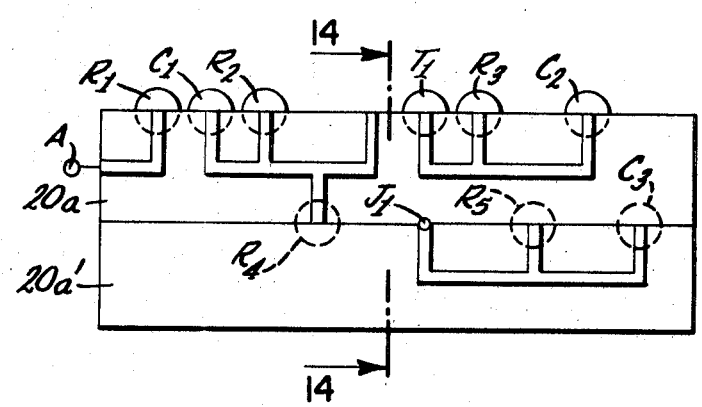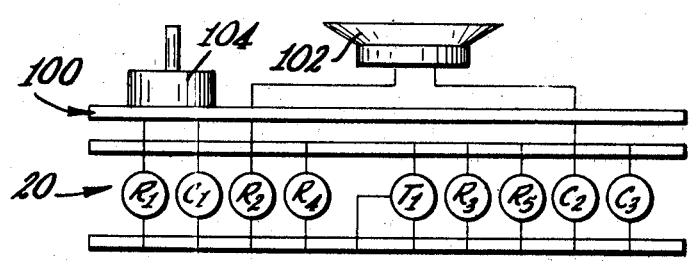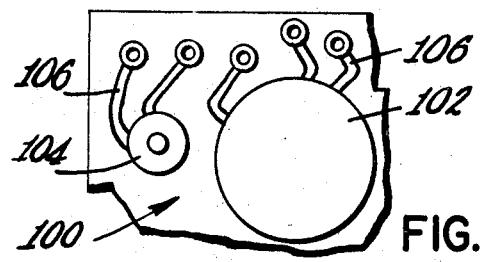

3,525,905
CHASSIS ASSEMBLY
George E. Chilton, 144 Valley Road,
Haworth, N.J. 07641
Filed Dec. 20, 1967, Ser. No. 692,039
Int. Cl. H05k 7/04
U.S. Cl. 317—101                                      11 Claims

ABSTRACT OF THE DISCLOSURE

A printed circuit board is provided with a thin conductive layer on both surfaces in the form of a network. The two networks are interconnected by electrically conductive films in edge notches which are also utilized for mounting components. By interruption of selected paths an assembly of electronic components may be fabricated with interconnections and cross overs provided automatically.

---

The utility of the present invention will be most apparent in the field of microminiature circuit packages and will be so described. However, it is to be clearly understood that the employment of the invention is not to be limited thereto. In addition, while the assembly method will be described in conjunction with high speed, automated assembly techniques, the improved chassis is especially well suited for conventional hand assemblies. The present invention is adaptable to both long and short production runs regardless of whether the assembling is done automatically, as will be described, or by hand.

While remarkable advances have been made in reducing the size and weight of electronic components, a comparable advance has not been achieved in either the packages therefor, or the mode of assembly of the components. This is primarily due to the dense packing of the components which makes hand assembly extremely difficult. Fully automatic assembly machines have not been found to be completely reliable for the same reason. Presently available automatic machines are, in addition, inordinately expensive and hence impractical for runs of limited quantity.

In carrying out the assembly method of the present invention, conveyor means having an intermittent motion is employed. The basic structure of such conveyors and their principle of operation are well known. Accordingly, only a generalized description of the conveyor and its function will be given.

The novel chassis which is part of the present invention may be formed by extruding an insulating material to any length. The chassis is comprised of a pair of transversely spaced, longitudinal strips extending parallel to the conveyor's plane of movement. A plurality of chassis pairs may be nestingly stacked one on top of another to form a multideck chassis. The bottom edge of each strip is provided with a plurality of transverse notches adapted to cooperate with the conveyor structure. In the assembled condition, the body of each component is disposed transversely between the two longitudinal strips that form the chassis pair. After the conveyor has transported the chassis past the hoppers and the components have been completely deposited, the chassis may be stacked one on top of the other, utilizing the structure to be particularly described hereinafter.

At this time it should be pointed out that preferably all surfaces of the chassis strips are provided with a layer of conductive material, which may be formed by laminating a copper foil thereon, or by employing any one of the known chemical deposition techniques. The preferred embodiment comprises an insulating base, having a layer of copper foil on all four sides which is selectively removed to form conductive paths. The chassis conductive layer and the components mounted on the chassis are then electrically connected by solder-dipping or other suitable techniques, such as blasting a hot gas against selected, pre-soldered areas.

Prior to the assembly of the components, certain portions of the copper grid, or copper foil layers, are sandblasted or otherwise removed to isolate sections of the circuit. Suitably shaped masks are used for this purpose. One advantage of using a mask is that the need for costly tooling is obviated. The mask which may be rubber and therefore hand punched is inexpensive. Since the mask may be so easily changed and at such little cost, the present system readily lends itself to prototype work as well as long production runs. This is the only structure that must necessarily be changed when either the design of the product is changed or when it is desired to use the same method and apparatus to produce several different products.

If desired, component spares may be inserted and the axial leads left isolated and unconnected. Thus, provision is made for rapidly and inexpensively repairing those particular portions of the assembly most susceptible to failure. This situation is fairly common, since some components have an expected useful life shorter than others. To effect the repair, the serviceman merely places a jumper wire from the spare component or assembly to that portion of the circuit containing the defective member.

To practice the method of the present invention, a plurality of hoppers feed the components to the chassis which is advanced in a stepwise manner by the conveyor. Each hopper is provided with means adapted to receive, hold and selectively release the axial, component leads as they are fed from the hopper. For example, suitably timed cams energize retaining means within each hopper to release a single component to spring fingers at the bottom, open end of each hopper. The chassis is provided with means to engage and pick off the component as the conveyor moves the chassis past the hopper. In the preferred embodiment a full set of components are discharged from the hopper at one time and are received by a number of longitudinally movable chassis therebelow.

Two or more parallel lines of hoppers may be used to fill several chassis simultaneously actuated by a single conveyor. Where the final product is complex (electrically) several chassis stacked one upon the other are employed. In this application, the hoppers to feed each deck of the chassis are in series and at a separate station, connective means join the vertically arrayed chassis. The connective means also serve to laterally space the parallel strips of each chassis. Alternatively, an upper deck without any components may be assembled to the lower chassis in the manner just described in order to serve as retaining means for the assembled components. Once again a separate station would be provided to stack the decks.

The method and article of the present invention are admirably suited to the mass production of chassis for electronic devices, such as radios, for example. If the equipment were to be operated at the rate of only one complete cycle of the conveyor per second, and this is not a very high rate, some 80,000 transistor radios could be manufactured per day. This figure is based on an average of sixty components per radio and three 8-hour shifts per day. Only one operator per shift is needed to feed the hoppers and to assure a continuous flow of chassis to the conveyor. Infinitely more complex assemblies could be manufactured at substantially the same rate, utilizing even the smallest most delicate components in relatively high density multideck package.

Since the present invention will find its greatest utility with the more complex assemblies, provision has also been made to accommodate elements in a wide range of sizes. Large or otherwise awkward to handle components such as speakers or tuning devices may be assembled on a conventional printed circuit board which is then plugged into the side of the chassis. At least two and possibly four such auxiliary circuit boards could be attached to the main chassis, one on each side.

Accordingly, it is an object of the present invention to provide an improved chassis for electronic components.

It is another object to provide an improved chassis, particularly for microminiature electronic components.

An additional object is to provide an improved chassis adapted for a nesting arrangement with other similarly constructed chassis.

Yet another object is to provide novel means for spacing and connecting a plurality of nested chassis.

A further object is to provide means for securing an auxiliary chassis to the main chassis.

Another object is to provide a microminiature, electronic component chassis having means for including spare parts.

Still another object is to provide a chassis of the aforementioned type that is adapted to cooperate with the movement of an intermittent conveyor.

An additional object is to provide a chassis adapted to accept microminiature components as they are automatically fed from a supply hopper.

A still further object is to provide a chassis of the aforementioned type having integral means thereon adapted to provide conductive pathways for electronic components.

An additional object is to provide a novel method for forming the conductive pathways.

A particular object of the present invention is to provide an improved method for assembling microminiature electronic components.

A feature of the present invention is that the improved assembly method is adapted to the use of either mass production techniques or hand assembly.

Another object of the present invention is to provide an automatic method of assembly that permits the packaging of a large number of electronic components in an envelope of minimum volume.

Still another object is to provide a method of simultaneously and automatically assembling microminiature electronic components in a plurality of chassis.

An additional feature of the present invention is to provide a method of assembly wherein the chassis is moved past component supply stations in a stepwise fashion and wherein the components are picked up by the moving chassis.

Yet another object of the present invention is to provide a method of assembly wherein the chassis is moved past component supply stations in a stepwise fashion and wherein the components are deposited on the moving chassis.

A further object is to provide a package of microminiature electronic components that includes a supply of spare parts.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing, like reference characters designate like parts.

In the drawing:

FIG. 2 is a pictorial view of a typical chassis member utilized in conjunction with the method of the present invention;

FIG. 3 is a plan view of a copper foil grid;

FIG. 4 is an enlarged, fragmentary side elevational view, partially broken away, of a pair of stacked chassis members without the conductive pathways;

FIG. 5 is a transverse section taken along 5—5 of FIG. 4;

FIG. 5A is a transverse partial section taken along line 5A—5A of FIG. 4;

FIG. 6 is a view representing a typical mask member that is employed at one stage of the method of the present invention;

FIG. 7 is a partially schematic and a partially pictorial illustration of the various stages of the present invention;

FIG. 8 is an enlarged schematic illustration of the spatial relationship of the feed hoppers and chassis shown in FIG. 7;

FIG. 9 is a transverse sectional elevational view illustrating a particular stage of the assembly method;

FIGS. 11, 12, 13 and 14 are respectively a front side view, a plan view, a rear side view and a transverse sectional view taken along line 14—14 of FIG. 11. These views are of a fully assembled multideck chassis;

FIG. 15 is a plan view illustrating means for securing an additional auxiliary chassis; and FIG. 16 is a side elevational view of the auxiliary chassis shown in FIG. 15.

Figure 1:
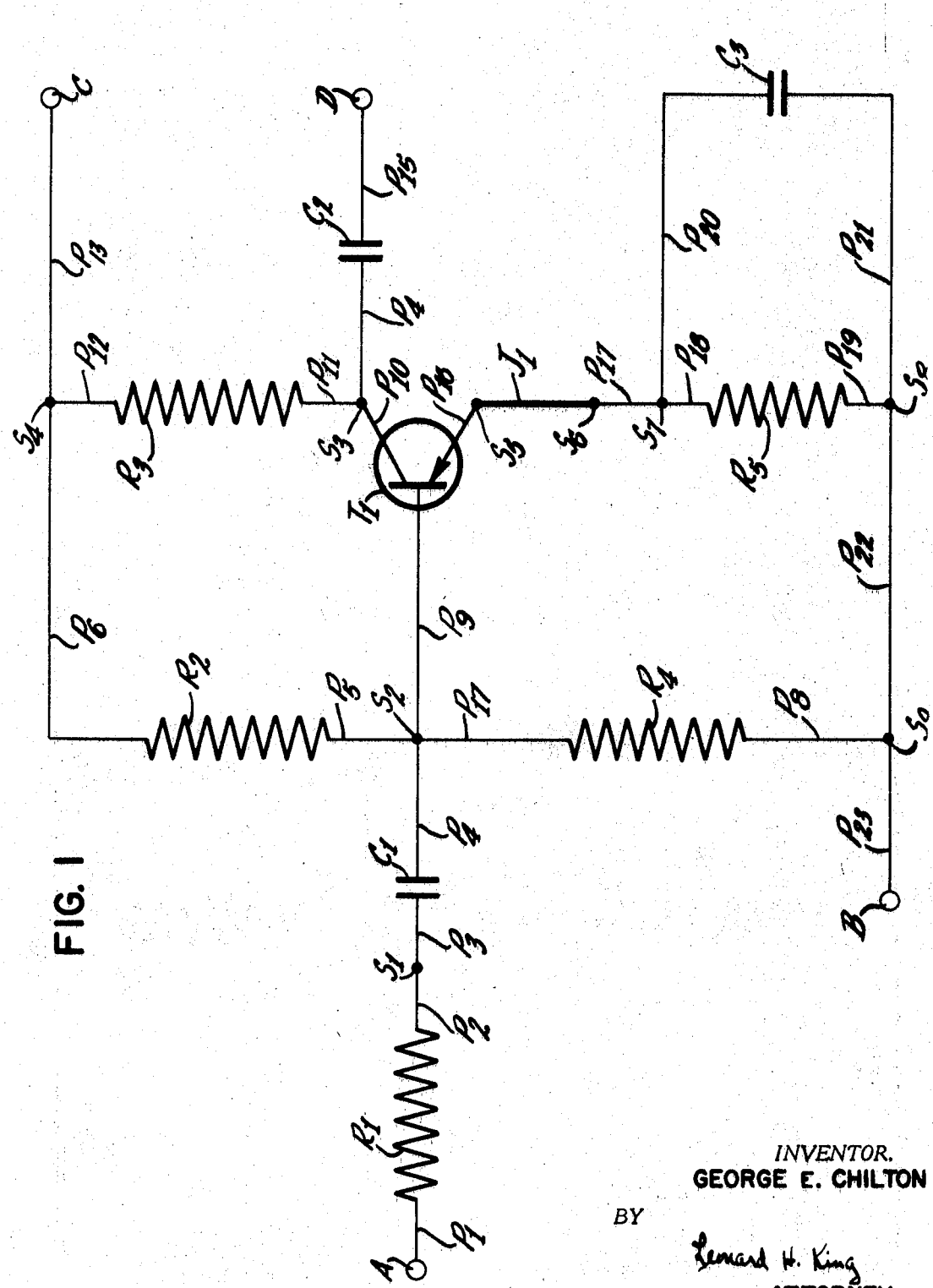
FIG. 1 is a schematic diagram of a typical combination of microminiature electronic components that may be assembled by the method and structure of the present invention. A single stage audio amplifier is represented by way of example.

Referring now to FIG. 1 of the drawing, a single stage audio amplifier will be used to illustrate the principles of the present invention. It should be understood that other electronic assemblies of either greater or lesser complexity can be automatically manufactured, using the structure and method of the instant invention. For the purposes of this discussion, the values and other electrical characteristics of the various components are of no importance. Therefore, the resistors are labeled $R_1$, $R_2$, $R_3$, $R_4$ and $R_5$; the capacitors are $C_1$, $C_2$ and $C_3$; and the transistor is $T_1$. The conductive paths between components, which may be leads integral with the components themselves or jumper wires, are arbitrarily labeled $P_1$, $P_2$, $P_3$, etc., while the solder joints are arbitrarily called out as $S_1$ $S_2$, $S_3$, etc.

The components are mounted on a chassis 20 (FIG. 2) which is comprised of an elongated rectangularly cross sectional strip having a core 22 formed from an insulating material such as ceramic, polystyrene, cellulose, acetate, nylon, polypropylene, etc. An outer conductive layer 24 of copper foil is applied to both elongated rectangular surface areas as well as the two elongated opposed sides of the chassis. The copper may be electroplated onto the substrate or applied in sheet form or grid form. A copper foil grid is shown in FIG. 3. As will be explained later, the four sided conductive lamination solves a long standing cross over or feed through problem in the printed circuit art.

It is contemplated that molding or extrusion technique will be employed to form the chassis core. The top elongated edge of each strip has a longitudinal tongue 26 provided with a plurality of transversely aligned, spaced notches 28, in which there is disposed the copper foil. The bottom elongated edge of each strip has a longitudinal groove 30 dimensioned to interfit with tongue 26 on the upper edge of the next lower chassis in a stack of chassis. Transversely aligned, spaced notches 32, also having a metalized conductive surface, are provided in the bottom edge of each strip.

One method of rigidly spacing two side-by-side strips 20a and 20b and joining an upper and lower deck is shown in FIG. 4 and FIG. 5. It will be seen that a transverse aperture 34 is provided through each tongue 26 at the ends thereof and a transverse aperture 36 is formed in the legs 30a and 30b which define groove 30. The combination of tongues, grooves and apertures provides a clevis type joint. When tongue 26 is seated in groove 30 and apertures 34 and 36 are in registry, a hollow spacing sleeve 38 is positioned between members 20a and 20b. Connective means, for example, a pin 40 having a headed end 42 and a threaded end 44, is passed through the apertures and the sleeve and is captured by a nut 46. Means have therefore been provided to secure upper and lower decks to each other and to spacedly secure the side-by-side chassis members to each other.

As shown in FIG. 5A, the lead 39 of component 37 is captured between two chassis sections so that metal layers 24 are in direct contact. Additional contact is provided by solder joint 41.

It has been convenient, as an optional feature to place apertures 34 and 36 in the vicinity of each tooth of the chassis. Accordingly, the chassis may be extruded, notches milled, and holes drilled on long lengths which are then cut to the particular size needed. There will therefore be apertures at the beginning of each chassis for use with the aforementioned pin arrangement. In this regard it should be noted that the transverse spacing between chassis members is a function of the spacer and pin length. Accordingly, the transverse spacing between chassis sides may readily be varied by changing the length of these members to accommodate the longest component in a given assembly. It is to be understood that the pin and sleeve spacing means is used by way of example only and that other equally simple and effective means, such as self-tapping threads on one end of the pin rivets or even a force fit may also be used.

Prior to assembling the components to the chassis selected portions of the laminated copper foil are removed at station 47. Conventional chemical resist and etching techniques may be used or the portions not needed may be abraded away such as by sandblasting with the aid of suitably formed masks. FIG. 6 illustrates a typical mask 48 having suitably positioned apertures 50 through which an abrasive material is forced under pressure. The mask is low in cost and may be a rubber compound that is readily punchable by hand. The factors determining aperture location in the mask will become apparent during the subsequent discussion of component layout.

It has also been found advantageous to presolder the chassis prior to assembly of the components thereto. This would be done at station 52. Since the relative positions of the components are determined prior to assembly and since the masking operation leaves only preselected areas of conductive foil the solder may readily be applied where required. All of the solder connections can therefore be made at one time.

In FIG. 7 there is shown one form of the apparatus utilized to carry out the method of the present invention. The aforementioned chassis-masking step is performed at station 47. Subsequently the chassis are placed on conveyor 53 which is schematically illustrated. The conveyor is adapted to linearly advance the chassis in a stepwise manner by means of a drive motor 54. Suitably shaped ridges 58 adapted to mate with notches 32 are formed on the top of spaced conveyor carriers 60. As the conveyor is driven to the left by the motor each ridge moves to the left carrying the chassis past a bank of hoppers 62 that contain the components.

To assure accurate placement of the component leads the preferred form of the invention has notches shaped as shown in FIG. 4. Notches 28 are defined by sloping, substantially parallel, transverse walls 70 and 72. With reference to the direction of chassis travel, the upper, open end of each notch is forward of the lower, closed end. For example, the chassis decks shown in FIG. 4 would be moved to the left as indicated by the arrow. In addition, the uppermost end of trailing wall 72 is provided with a transverse chamfer or bevel 74 inclined in an angularly opposite direction to walls 70 and 72 to define a mouth 76. The conductive ends of the component are thereby picked off from the bottom of the hopper and are led or directed into the notch so that they may fall to the bottom thereof. The angle of the lower portion of the notch tends to retain the components upon movement of the chassis carried by the conveyor.

A preferred method of applying components to the moving chassis is schematically shown in FIG. 8. All of the hoppers simultaneously release a single component to the chassis positioned therebelow. The chassis are then moved by the conveyor so that they are positioned below successive hoppers. For example, if a particular chassis called for six components, such as the upper deck in FIGS. 10–14, there would, of course, have to be at least six equally spaced hoppers. The chassis are fed one after the other onto the conveyor and at suitably programmed intervals a component is either released or removed from each hopper. As will now be explained, the first five chassis would be incomplete when they completely traverse the conveyor and wouldl have to be discarded or reworked. However, the sixth chassis and all chassis thereafter would have a full complement of components.

Referring now particularly to FIG. 8, it will be seen that a chassis is positioned under each of the hoppers. There are six hoppers A–F and six chassis a–e. It is important to note that first hopper A is positioned over the first notch in chassis a, second hopper B is positioned over the second notch in chassis b, etc. Thus, sixth hopper F would be positioned over the sixth notch in chassis f. At this time a single component would be released from each hopper by suitable means such as solenoid actuated gates. The chassis would then be incrementally moved so that the first notch of chassis b is under hopper A, the second notch of chassis c is under hopper B, etc. Chassis a has been discharged and the sixth notch of a new chassis placed under hopper F to replace chassis f which now has its fifth notch under hopper E. A component is again released from each hopper and the cycle repeated.

From the foregoing it will be evident that that chassis a will only receive one component before it is discharged and each succeeding chassis will have one more component than its predecessor until the sixth chassis is reached. Obviously, then, the first five chassis will be incomplete and will have to be discarded or reworked. The sixth chassis and all those thereafter will have a full complement of components. The spacing between the chassis is a function of the equal spacing between the hoppers. Since the chassis have equal spacing therebetween, stepwise movement of the conveyor in equal lengths will always assure that the proper chassis notch is positioned under the proper hopper when the components are released.

An alternative form of chassis transfer is achieved by an irregular or non-uniform movement of the conveyor mechanism. Instead of the intermittent, linear conveyor movement described above, the conveyor moves linearly for a distance defined by the space between the hoppers. As the correct chassis notch approaches the hopper holding the component therefor, the conveyor is raised so that the edges of the upwardly facing notch may mechanically pick off a component releasably held at the bottom of the hopper. In place of the electrically operated gate, the components are gravity fed to the bottom of the hopper whereby the lowermost component can be held by spring fingers.

It is to be noted that the stepwise advancing motion may be applied to a conveyor table of any length, say 10 feet long by 4 feet wide. Several parallel lines of hoppers could thereby feed several parallel lines of chassis. The apparatus being assembled in each line could be the same or, as in more complex devices, each line could produce a different chassis which are then stacked upon completion to form a single apparatus. As mentioned previously, the various levels of a multi-deck chassis could be filled by series disposed hoppers.

That is, when one deck is full it continues in the same direction, another deck is added on top, and the top deck is then filled. The chassis, of course, is driven in the same direction by the conveyor.

Thus it will be seen that a relatively high density package may be made in a small volume. For example, in a package 10 cm. high by 10 cm. long, 80 or so components can readily be inserted. If the spacing between notches is reduced, a substantially greater density may be obtained. For extremely small components, the spacing of but 100 mils may be employed and thousands of components may be incorporated for such things as computers.

When the appropriate components are positioned in the correct chassis notches, they are soldered to the conductive grid at station 80. As mentioned hereinabove, the chassis are presoldered so that the components may be secured by a blast of hot gas in station 80. The chassis may be disposed on a continuous belt conveyor 82 which traverses the soldering station. The belt conveyor could extend to the carrier conveyor to receive the chassis or an inclined chute 84 could be interposed between the two conveyors to gravity-feed the assembled chassis. By this method, electrical connections, where required, are made which are comparable in function to those designated $S_1$, $S_2$, $S_3$, etc. of FIG. 1.

An alternative soldering method is shown in FIG. 9. Solder tips 86, having a suitably timed motion, are disposed on either side of the conveyor. Once the components are placed in their respective notches, an appropriate pair of tips 86 are actuated to secure the component. It is also within the scope of the present invention to elongate the conveyor beyond the length needed to accommodate all the hoppers. The soldering station would then be near or at the end of the conveyor and all of the connections would be made at one time.

Where a multideck chassis is required, the stacking or assembling of additional decks takes place at station 90 (FIG. 7). At this time the spacing sleeve 38 and pin 40 illustrated in FIGS. 4 and 5 are utilized. While only a two-deck chassis is shown, it should be understood that a greater number could be similarly stacked with the same type of hardware.

Figure 10:
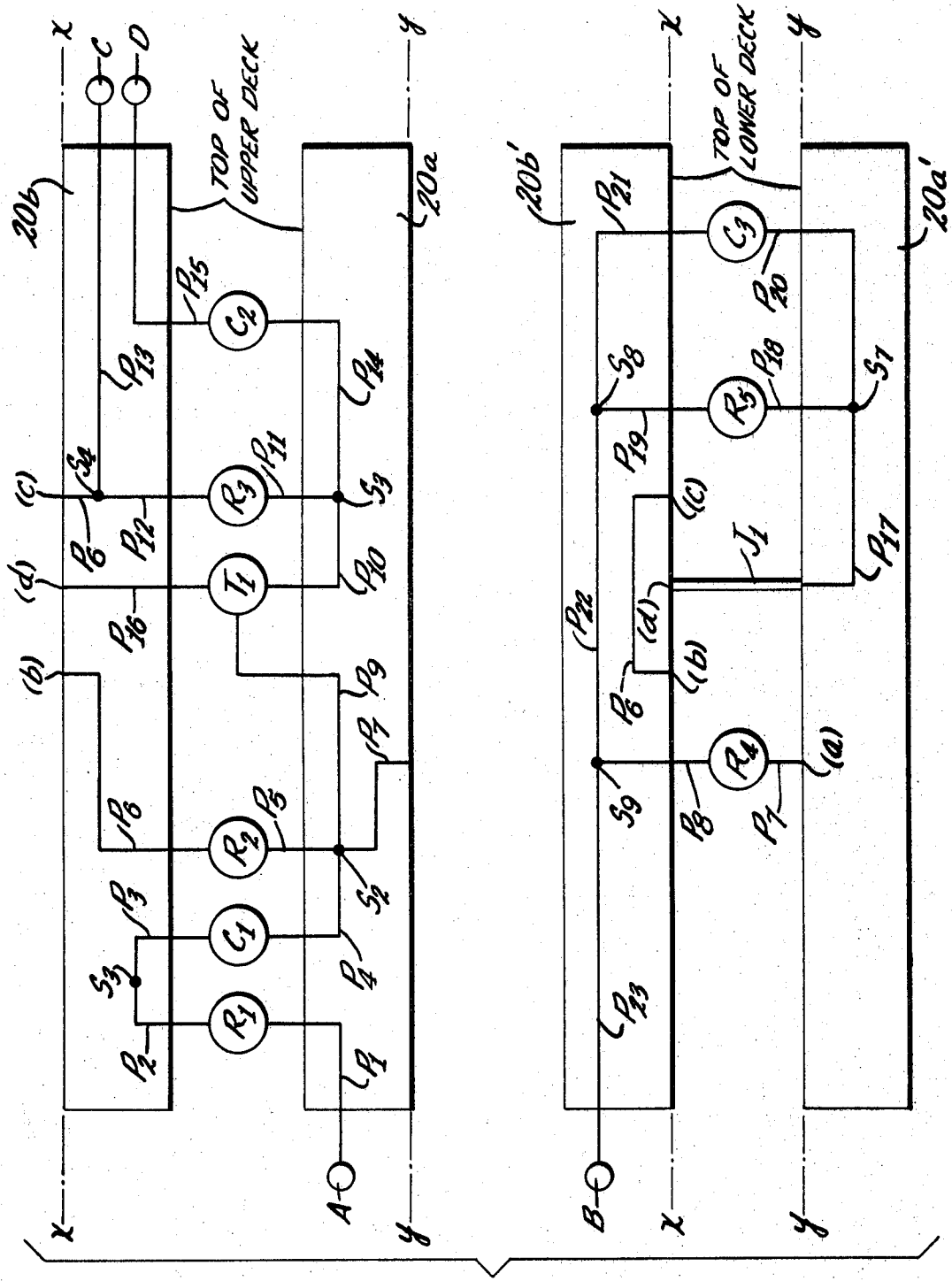
FIG. 10 is a schematic developed view illustrating a typical two-deck chassis containing the components shown in FIG. 1.

The developed showing of FIG. 10 diagrammatically illustrates the four strips of a two-deck chassis containing all the components of FIG. 1. By way of definition, a strip is one element, such as 20a of a chassis 20 which is comprised of a pair of parallel strips 20a, 20b. A multideck chassis would be comprised of stacked chassis 20, 21', etc. (FIG. 5).

For purposes of illustration (FIG. 10) the two pairs of strips that comprise the complete chassis have been placed with their normally opposed faces directed downwardly. To simplify the drawing, the tongues, grooves, and transverse notches have been omitted. At this point it should be noted that, while it may very well be possible to accommodate all of the FIG. 1 components on a single chassis, the present arrangement was selected to illustrate a typical multideck configuration required in a more complex assembly such as a transistorized radio.

The strips of the upper deck chassis 20 have been labeled 20a and 20b while the strips of the lower deck chassis 20' have been labeled 20a' and 20b'. In the assembled condition, lines x—x will abut each other and lines y—y will abut each other. Further, the conductive pathways P are electrically continuous at those points marked (a), (b), (c) and (d). As in FIG. 1, the conductive pathways are labeled $P_1$, $P_2$, $P_3$, etc., the points at which solder connections are made on the conventional type chassis have been labeled $S_1$, $S_2$, $S_3$, and the terminals have been marked A, B, C and D. It will thus be seen that the components shown in FIG. 10 are electrically interconnected in the same manner as in FIG. 1.

FIGS. 11–14 show the components of FIG. 1 in the same physical relationship as FIG. 10. Jumper wire J, extending between adjacent leads of $T_1$ and $R_5$, $C_3$, is secured at $S_5$ and $S_6$ and was inserted in the same manner as the other components, that is, from a hopper. The use of a jumper wire is illustrative of how otherwise awkward connections may be simplified. It will be seen, particularly in FIG. 11 and FIG. 13, that the original conductive grid shown in FIG. 2 has been altered by mask 48 so that the only remaining conductive paths will provide the circuit of FIG. 1. It should be noted that a solid laminated copper foil could be formed into a pattern of isolated conductors by selective removal of material by known techniques. In that case, of course, large areas of the conductive foil would have to be removed. While this may be some slight disadvantage, the formation of the basic chassis would be simplified. Alternatively, where a grid pattern is used, discrete portions thereof may be broken to isolate the various components rather than removing all of the unwanted grid. In any event, the placement of the conductive laminate within the notches of the chassis solves a long standing and vexing problem in the printed circuit art. The prior art devices frequently had difficulty providing a conductive path in the small holes that are used as feed throughs for the component terminals. The conductively laminated notches in the chassis of this invention provide easily soldered cross overs for the component leads because the copper layer completely covers the contact surface of each notch.

It will be evident that, in addition to wire $J_1$, spare components may readily be inserted in any of the blank notches in the lower deck. Thus, should one of the components prove to be defective, a serviceman could easily add a jumper wire to connect a spare part in place of the defective element.

A variation of this technique that illustrates the versatility of the present invention is shown in FIG. 15 and FIG. 16. Merely by extending at least one lead of both $R_2$ and $C_2$, an auxiliary chassis 100 may be attached. Chassis 100 is a conventional printed circuit board having conductive apertures through which the aforementioned leads project. By way of example, a speaker 102 and a potentiometer 104 are shown mounted on the chassis which includes circuit paths 106. It should be understood that other elements such as volume controls, variable tuning devices, etc. may also be included. It is also apparent that a second auxiliary chassis may be similarly mounted on the opposite side of the chassis. This construction facilitates the assembly of bulky components that do not readily lend themselves to a conveyor form of assembly of the type described.

It will be evident from the foregoing description that an improved chassis, an improved package, as well as an improved method of assembly, have been provided. The chassis itself may be inexpensively fabricated as an extrusion, then notched, drilled, and cut to the desired length. Dual purpose spacing means that are readily attached permit the chassis to be nestingly stacked one above the other while their transverse spacing is fixed to accommodate the largest component used. While the chassis have been designed for automated, high speed construction, and have been so described, they may be advantageously used for hand assembly as well as short run production. The toothed configuration aids materially in the placement and retention of the components.

In combination with the aforementioned physical characteristics of the chassis, the instant method of forming the conductive paths yields other advantages and solves the feedthrough problem encountered in conventional printed circuit boards. Preformed circuit paths are soldered at the appropriate points. Since the components are inserted in presoldered conductive notches, all electrical connections may be made simultaneously by use of a blast of hot gas. Solder dipping is an alternative to presoldering.

The use of masks provides inexpensive means for changing from one circuit design to another. Without resorting to considerable layout work and by rapid, inexpensive means, different conductive paths may be evolved by replacing the mask and forming different pathways. The chassis includes copper foil on all four sides as well as within the notches. This construction simplifies making repairs and additional connections to the inside surface of the chassis. The pathways are formed where desired prior to assembly of the components.

The present design of the chassis simplifies the addition of large components that may not conveniently be fed from a hopper. The component leads are purposely left long and are fed through suitably placed conductive holes in a conventional printed circuit board. Potentiometers, speakers, etc., are then mounted on the printed circuit board in the normal manner. Auxiliary boards may be placed on either side of the chassis and, by bending the leads either up or down, auxiliary boards can be mounted either above or below the chassis.

There has been disclosed heretofore the best embodiment of the invention presently contemplated and it is to be understood that various changes and modifications may be made by those skilled in the art without departing from the spirit of the invention.

What is claimed is:

1. A chassis adapted to have electrical components secured thereto, said chassis comprising:
   (a) at least one pair of non-conductive cores, each of said cores being defined by a relatively thin elongated relatively large rectangular surface area extending between longitudinal edges having a plurality of traverse notches extending into at least one of the longitudinal edges, the notches being arranged in spacedly opposed pairs that are arranged to receive electrical component terminals;
   (b) a continuous layer of conductive material integral with at least one elongated surface area of each of said cores and with the surface of each notch; and
   (c) connecting means for attaching one said chassis with another said chassis along their longitudinal edges whereby the cores of an attached pair are in the same plane.

2. A chassis adapted to have electrical components provided with lead terminals secured thereto, said chassis comprising:
   (a) at least two pairs of non-conductive cores, the pairs being disposed one above the other, each of said cores being defined by a relatively thin elongated relatively large rectangular surface area extending between longitudinal edges having a plurality of traverse notches extending into one said longitudinal edge the notches of said pairs of cores being arranged in spacedly opposed pairs that are arranged to receive the component lead terminals and the longitudinal edges of said cores including an elongated tongue, the other longitudinal edges of said pairs of cores including an elongated groove dimensioned to receive said tongue of a like chassis; and
   (b) a layer of conductive material integral with at least one elongated surface area of each of said cores and continuous with the surface of each notch.

3. The device in accordance with claim 2 wherein said tongue is along the notched side of said core.

4. The device in accordance with claim 3 wherein said tongues and said grooves include at least one transverse aperture therein to receive fastening means.

5. The device in accordance with claim 4 wherein there is a plurality of apertures through said tongues, the apertures being intermediate said notches, and wherein the apertures through the grooves are directly opposite the tongue apertures.

6. The device in accordance with claim 2 wherein the notches are approximately U-shaped and are defined by a pair of spacedly opposed transverse side walls positioned at an angle to the longitudinal axis of said core.

7. The device in accordance with claim 2 wherein the open end of each notch is wider than the closed end thereof.

8. The device in accordance with claim 2 wherein said layer of conductive material is provided on both said rectangular surface areas of each of said cores.

9. The device in accordance with claim 2 wherein said layer of conductive material is provided on both said rectangular surface areas and both said elongated sides of each of said cores.

10. The device in accordance with claim 2 wherein said layer of conductive material is in the form of conductive pathways.

11. The device of claim 3 wherein said cores include connecting means for attaching auxiliary chassis thereto.

References Cited
UNITED STATES PATENTS

| | | |
|---|---|---|
| 3,087,096 | 4/1963 | Jorgensen. |
| 3,185,947 | 5/1965 | Freymodsson. |
| 3,304,468 | 2/1967 | Lawson. |
| 3,377,516 | 4/1968 | Ellett et al. |
| 3,408,452 | 10/1968 | Ruehlemann. |

ROBERT K. SCHAEFER, Primary Examiner

J. R. SCOTT, Assistant Examiner

U.S. Cl. X.R.

174—68.5